US008370748B1

(12) United States Patent
Maity (10) Patent No.: US 8,370,748 B1
(45) Date of Patent: Feb. 5, 2013

(54) WEB-BASED SYSTEMS MANAGEMENT ARCHITECTURE FOR SERVER HARDWARE (SMASH) COMMAND LINE PROTOCOL (CLP)

(75) Inventor: Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 1170 days.

(21) Appl. No.: 11/964,462

(22) Filed: Dec. 26, 2007

(51) Int. Cl.
  *G06F 3/00* (2006.01)
(52) U.S. Cl. ......... 715/738; 715/762; 715/763; 715/854
(58) Field of Classification Search ............... 715/738, 715/762, 763, 854
  See application file for complete search history.

(56) References Cited

U.S. PATENT DOCUMENTS

| 7,751,428 B2* | 7/2010 | Bumpus et al. ............... 370/464 |
| 2008/0222603 A1* | 9/2008 | Shaw et al. .................. 717/120 |
| 2009/0013056 A1* | 1/2009 | Weinstock et al. ........... 709/208 |
| 2009/0037551 A1* | 2/2009 | Gupta .......................... 709/208 |

* cited by examiner

*Primary Examiner* — William Bashore
*Assistant Examiner* — Mylinh Tran
(74) *Attorney, Agent, or Firm* — Morris Manning & Martin, LLP; Tim Tingkang Xia, Esq.

(57) ABSTRACT

Technologies are provided herein for executing SMASH CLP commands through a Web-based GUI. A baseboard management controller ("BMC") includes a Web server program and a SMASH CLP engine. The SMASH CLP engine is configured to execute SMASH CLP commands with respect to managed entities or targets within a host computer system. A software interface is also provided between the Web server program and the SMASH CLP engine. Through the interface, the Web server can transmit SMASH CLP commands to the SMASH CLP engine for execution and receive the results of the execution of the SMASH CLP commands. The BMC stores a Web page which, when rendered by a Web browser, provides a GUI for the creation and execution of SMASH CLP commands by the SMASH CLP engine.

16 Claims, 7 Drawing Sheets

WEB-BASED SYSTEMS MANAGEMENT ARCHITECTURE FOR SERVER HARDWARE (SMASH) COMMAND LINE PROTOCOL (CLP)

BACKGROUND

The Systems Management Architecture for Server Hardware ("SMASH") is a suite of specifications that deliver industry-standard protocols to increase productivity of the management of a data center. The SMASH command line protocol ("SMASH CLP") specification defines an intuitive command line interface to server computers independent of machine state, operating system ("OS"), OS state, system topology, or access method. In this way, SMASH CLP provides a common grammar and syntax for cross-platform management of server hardware using out-of-band communications.

SMASH CLP is specified for use via a serial console, such as a Secure Shell ("SSH") or Telecommunication Network ("TELNET") protocol connection. Because SMASH CLP requires access via a serial console, however, a system administrator may be unable to administer a computer system if no SSH or TELNET client application is available. This is common because many types of computing devices do not provide these clients. Moreover, because SMASH CLP is a command line protocol, it can be very difficult for a user to remember all of the SMASH CLP commands and their syntax. As a result, using SMASH CLP via a serial console, as required in current implementations, can be a difficult and frustrating experience for system administrators.

It is with respect to these considerations and others that the disclosure presented herein has been made.

SUMMARY

Technologies are provided herein for executing SMASH CLP commands through a World Wide Web ("Web")-based graphical user interface ("GUI"). By using a Web-based GUI for the execution of SMASH CLP commands, a system administrator can administer a computing system that has been configured in the manner presented herein from any computing device that allows access to the Web. For instance, a Web-enabled wireless telephone may be utilized to administer a computing system using SMASH CLP commands. Moreover, through the Web-based GUI presented herein, a system administrator can easily create and execute SMASH CLP commands without the need to remember the commands or their syntax.

According to one aspect presented herein, a baseboard management controller ("BMC" or "service processor") is provided for use within a host computer system. The BMC includes a Web server program and a SMASH CLP engine. The SMASH CLP engine is configured to execute SMASH CLP commands with respect to managed entities within the host computer system. A software interface is also provided between the Web server program and the SMASH CLP engine. Through the interface, the Web server can transmit SMASH CLP commands to the SMASH CLP engine for execution and receive the results of the execution of the SMASH CLP commands.

According to other aspects, the BMC also stores a Web page which, when rendered by a Web browser application program ("Web browser") executing on a client computer, provides a GUI for the creation and execution of SMASH CLP commands. When rendered by a Web browser, the Web page provides a GUI for visually constructing a SMASH CLP command. Through the GUI, a user can construct a SMASH CLP command and submit the SMASH CLP command to the Web server program for execution on the SMASH CLP engine. The results of the execution of the SMASH CLP command are displayed within the GUI presented by the Web page. Moreover, a graphical tree is displayed that shows a hierarchical representation of the entities managed by the BMC within the host computer system. The graphical tree is interactive and can be utilized in the construction of SMASH CLP commands.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a Web-based SMASH CLP interface. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

Figure 1:
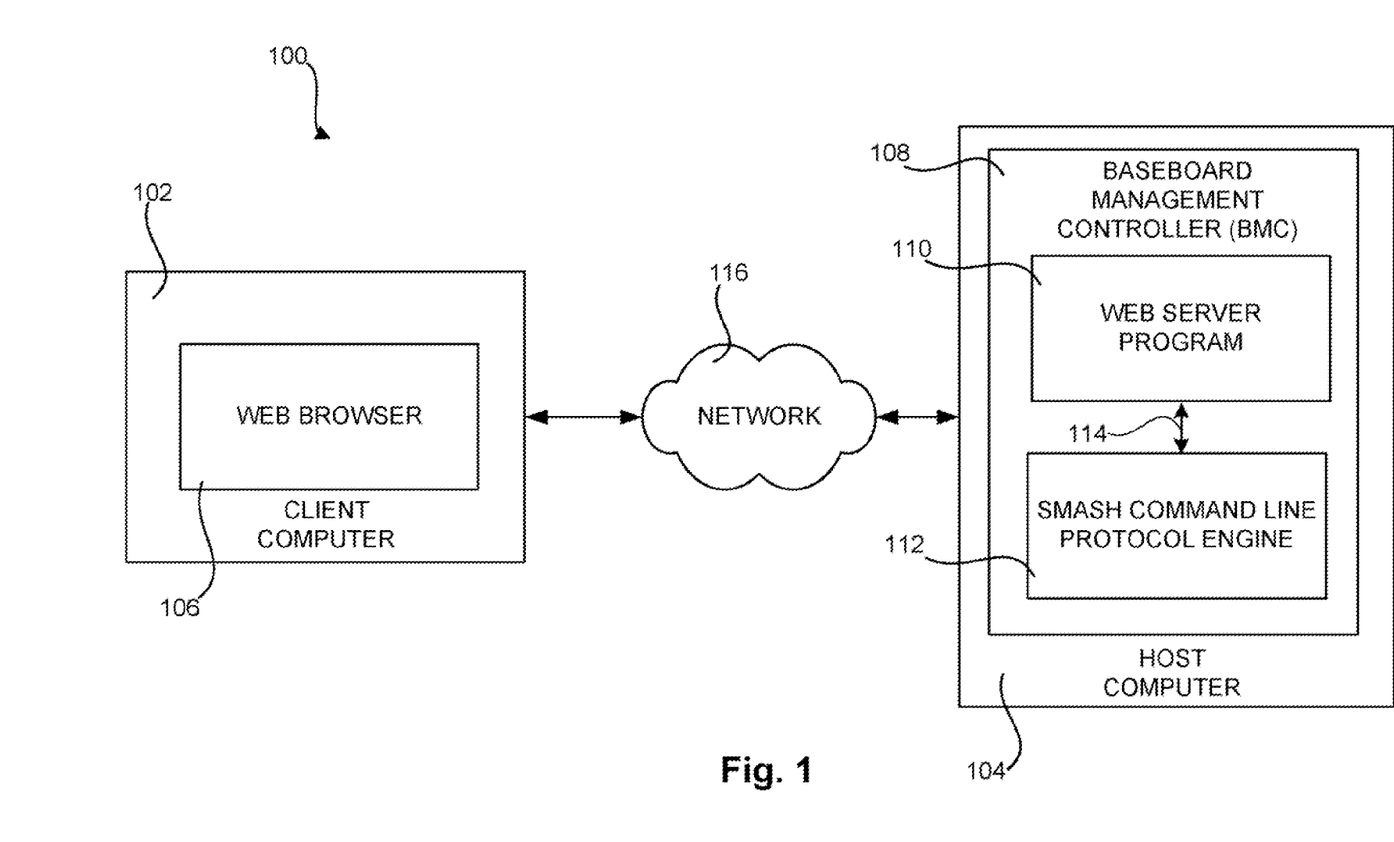
FIG. 1 is a network diagram showing aspects of a client computer and a host computer utilized in embodiments presented herein.

FIG. 1 is a network diagram showing a system 100 provided herein that includes a client computer 102 and a host computer 104. The client computer 102 comprises a computing device operative to execute one or more application programs, such as the Web browser 106, for connecting to and communicating with the host computer 104 through a network 116. It should be appreciated that the client computer 102 may comprise any type of computing device capable of retrieving and rendering Web pages. For instance, the client computer 102 may comprise a standard laptop, desktop, or server computer, a wireless telephone, a personal digital assistant ("PDA"), a video game console, a set-top television receiver, or other type of computing device. As used herein, the term Web page refers to a resource of information that can be accessed through a Web browser. Web pages often utilize the hypertext markup language ("HTML") over the Hypertext Transfer Protocol ("HTTP"), but may also utilize other transport protocols, markup languages, rendering technologies, client or server-side scripting, executable plug-ins, and other technologies. The network 116 may be a local area network ("LAN"), a wide area network ("WAN") such as the Internet, or other type of network.

The host computer 104 comprises a network-enabled server computer equipped with a BMC 108. The BMC 108 is a specialized microcontroller that is configured to monitor and control aspects of the operation of the host computer 104. The BMC 108 monitors operating and performance-related parameters received from various software and hardware components of the host computer 104, referred to herein as "managed entities" or "targets." For example, the BMC 108 may monitor health-related aspects associated with the host computer 104, such as temperature, cooling fan speeds, power mode, operating system status, and other parameters within the host computer 104. The BMC 108 monitors sensors to obtain this information and may transmit an alert to a system administrator if any of the parameters exceed preset limits. A system administrator may also communicate with the BMC 108 to take some corrective action such as resetting or power cycling the host computer 104. Communication with the BMC 108 is possible even if an operating system executing on the host computer 104 has not yet been installed or is corrupted.

According to embodiments, the operation of the BMC 108 adheres to the Intelligent Platform Management Interface ("IPMI") industry standard for system monitoring and event recovery. The BMC 108 is communicatively connected to one or more components within the host computer 104 either directly or by way of a system management bus. In addition, the BMC 108 may also be configured with its own network interface card ("NIC") for direct communication with computer systems on the network 116, such as the client computer 102 and the Web browser 106.

According to the various embodiments presented herein, the BMC 108 includes a Web server program 110 and a SMASH CLP engine 112. The Web server 110 is a server application that is configured to receive and respond to requests from a Web browser 106 for Web pages and associated files stored at the BMC 108. The SMASH CLP engine 112 is a program that is configured to execute within the BMC 108 and to receive and execute SMASH CLP commands with reference to managed entities within the host computer 104. The SMASH CLP engine returns the results of the execution of a SMASH CLP command as a text stream.

According to one aspect presented herein, a software interface 114 is provided between the Web server program 110 and the SMASH CLP engine 112. As will be described in greater detail below, the Web server program 110 is configured to receive and respond to requests for a Web page stored at the BMC 108 that provides a GUI for creating and executing a SMASH CLP command when rendered by the Web browser 106. The GUI provides capabilities for building a SMASH CLP command along with a GUI control which, when selected, will instruct the Web server program 110 to execute the specified SMASH CLP command.

In response to receiving a request to execute a SMASH CLP command from the Web browser 106, the Web server program 110 utilizes the interface 116 to request that the SMASH CLP engine 112 execute the specified SMASH CLP command. In response thereto, the SMASH CLP engine 112 executes the specified command and returns the results of the execution of the specified SMASH CLP command to the Web server 110 via the interface 114. In turn, the Web server program 110 returns the results of the execution of the SMASH CLP command to the Web browser 106 for display to a user. Additional details regarding this process will be provided below with respect to FIGS. 3-7.

Figure 2:
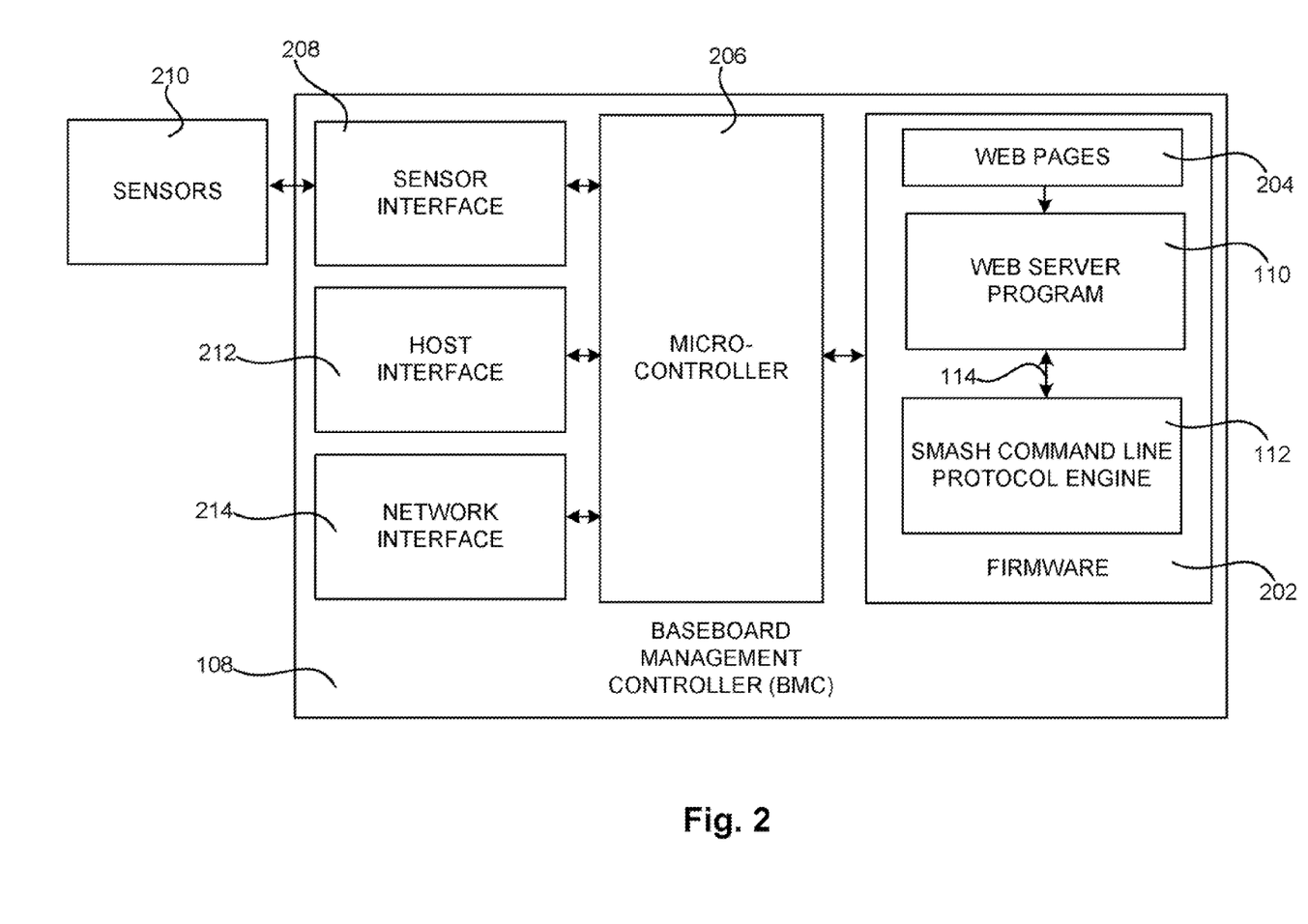
FIG. 2 is a hardware architecture diagram showing aspects of a BMC provided by embodiments described herein.

FIG. 2 is a hardware architecture diagram showing aspects of a BMC provided by embodiments described herein. In particular, the BMC 108 illustrated in FIG. 2 includes a microcontroller 206 for coordinating the operation of the BMC 108. It should be appreciated that although a microcontroller 206 has been illustrated in FIG. 2, other types of processors may also be utilized.

The microcontroller 206 communicates with a sensor interface 208 coupled to one or more sensors 210. As discussed briefly above, the sensors 210 are utilized to monitor health-related aspects of the host computer 104. For instance, the temperature of one or more components, the speed of rotational components, the voltage across or applied to one or more components, and the available or used capacity of memory devices within the host computer 104 may be monitored. According to embodiments, the BMC 108 also includes a host interface 212. The host interface 212 may comprise an interface to a system management bus connected to the host computer 104. Through the system management bus, the BMC 108 can retrieve information regarding the health status of software executing on the host computer 104. Through this interface, the BMC 108 can also instruct the host computer 104 to perform various management-related functions such as, for instance, restarting or adjusting operational parameters.

According to implementations, the BMC 108 also includes a network interface 214 capable of providing an interface to the network 116. Because the BMC 108 includes a network interface 214 that operates independently of the network connections to the host computer 104, the BMC 108 can be made available for communication even when the host computer 104 is powered off or not functioning properly. In this manner, the BMC 108 can be utilized to power on the host computer 104, restart the host computer 104 in the event of a software failure, or perform other functions even when the host computer 104 is non-responsive.

According to other aspects presented herein, the BMC 108 also includes a firmware 202 that is executed by the microcontroller 206. The firmware 202 includes program code that defines the operation of the BMC 108 as described herein. In addition to the conventional functions performed by the BMC 108, the firmware 202 also includes a Web server program 110 and a SMASH CLP engine 112. As discussed briefly above, the Web server program 110 is a server application configured to receive and respond to requests from a Web browser 106 executing on the client computer 102 for Web pages 204 stored within the firmware 202. The SMASH CLP engine 112 is a program that is configured to execute within the BMC 108 and to receive and execute SMASH CLP commands with reference to managed entities, or targets, within the host computer 104. The software interface 114 is provided between the Web server program 110 and the SMASH CLP engine 112 that allows the Web server program 110 to instruct the SMASH CLP engine 112 to execute SMASH CLP commands. The results of the execution of the commands are returned to the Web server program 110 via the interface 114.

As will be discussed in greater detail below, the Web server program 110 is configured to receive requests via the network interface 214 for the Web pages 204 stored within the firmware 202 of the BMC 108. The Web pages 204 are configured to present a GUI for creating and executing SMASH CLP commands when rendered by the Web browser 106. The GUI provided by the Web pages 204 include capabilities for graphically creating a SMASH CLP command, along with GUI controls which, when selected, instruct the Web server program 110 to execute the SMASH CLP command. Additional details regarding the contents, form, and execution of the Web pages 204, are provided below with reference to FIGS. 3-5.

It should be appreciated that the functional components illustrated in FIG. 2 are merely illustrative and that the BMC 108 may include more or fewer components than illustrated. It should also be appreciated that the simplified hardware architecture illustrated in FIG. 2 for the BMC 108 is also illustrative and that other types of architectures and implementations may be utilized. For instance, other types of processors may be utilized within the BMC 108, and other firmware programs may be stored within the firmware 202 for execution by the microcontroller 206 to control the operation of the BMC 108.

Figure 3:
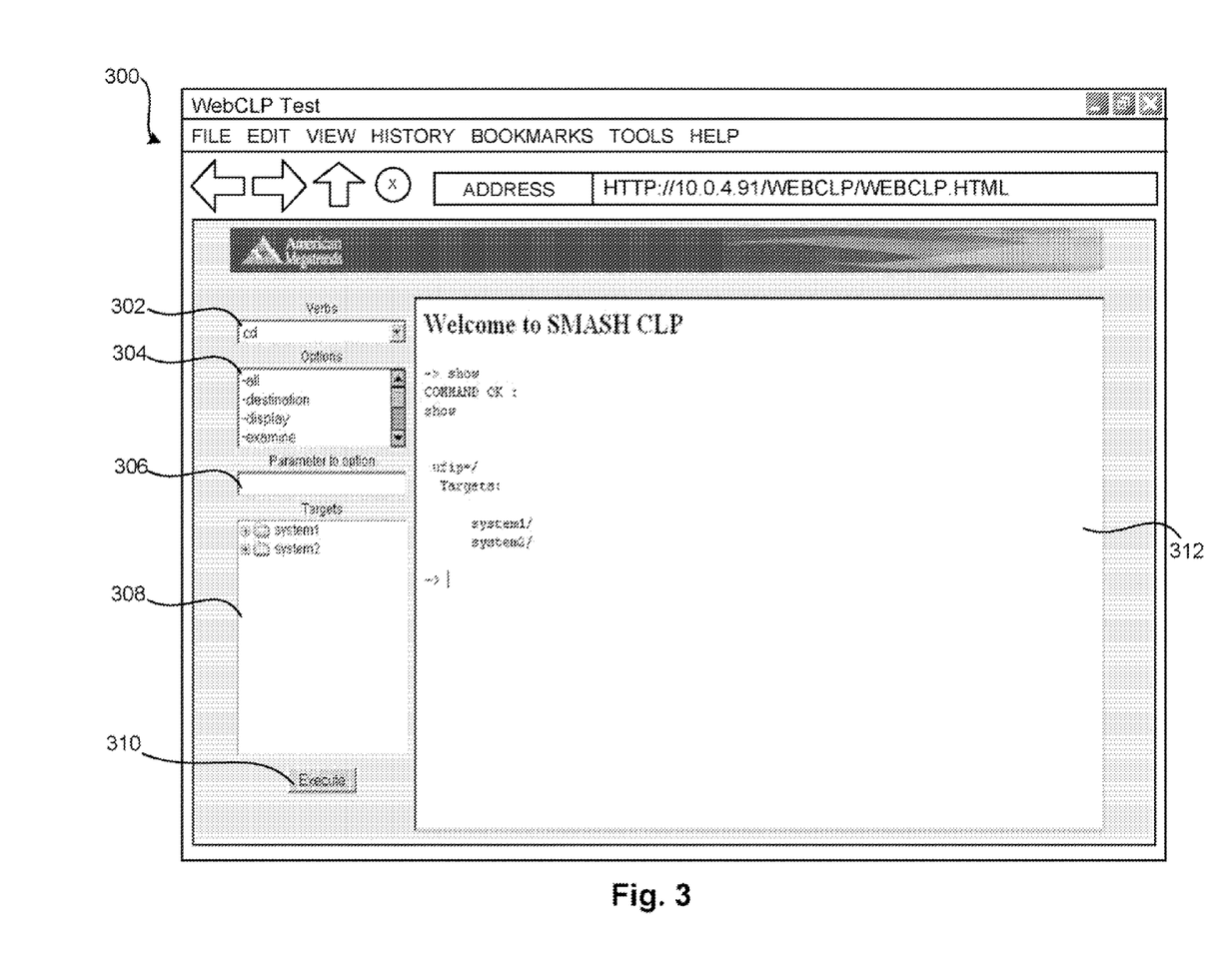
FIGS. 3-5 are screen diagrams showing aspects of a Web-based user interface provided herein for submitting SMASH CLP commands to a BMC in one embodiment.

FIG. 3 is a screen diagram showing aspects of a Web-based user interface provided herein for submitting SMASH CLP commands to the BMC 108. In particular, FIG. 3 shows a screen display 300 generated by the Web browser 106 by rendering one of the Web pages 204. As discussed briefly above, the Web browser 106 connects to the Web server program 110 through the network interface 214 to request a Web page 204. When rendered by the Web browser 106, the screen display 300 illustrated in FIG. 3 is presented to a user of the client computer 102.

As discussed briefly above, the screen display 300 provides a graphical user interface for creating and executing SMASH CLP commands on the SMASH CLP engine 112 of the BMC 108. In particular, user interface controls are provided through which a user may graphically construct a SMASH CLP command. Once the command has been constructed, a user interface control 310 may be selected by a user to cause the created SMASH CLP command to be submitted to the Web server program 110 for execution on the SMASH CLP engine 112. In one embodiment, the available user interface controls include a user interface control 302 for selecting a SMASH CLP verb. As will be discussed in greater detail below with respect to FIG. 5, the SMASH CLP verbs are presented utilizing a drop down menu user interface control in the one embodiment. Through this user interface control, a user can select the desired SMASH CLP verb.

The GUI presented in the screen display 300 also includes a user interface control for selecting one or more options for the selected SMASH CLP verb. Through the use of the user interface control 304, a user can select one or more options to be applied to the selected verb. Moreover, a user interface control 306 is provided through which a user can specify a parameter to a selected option. In one embodiment, the user interface control 306 includes a text box into which a user may type the specified parameter.

A user may also specify a target for the SMASH CLP command utilizing a graphical tree 308 that hierarchically illustrates the management targets within the host computer 104. The graphical tree 308 is populated when the Web page 204 is initially transmitted to the Web browser 106. The tree 308 is interactive, thereby allowing a user to view all of the available targets within the host computer 104. As will be discussed in greater detail below with respect to FIG. 5, a selected target within the graphical tree 308 can be utilized in conjunction with the specified SMASH CLP command.

Once a user has finished constructing a SMASH CLP command using the user interface controls shown in the screen display 300, the user may select the user interface control 310 to cause the specified SMASH CLP command to be executed at the BMC 108. As discussed above, the Web browser 106 transmits the data identifying the specified SMASH CLP command to the Web server program 110. In turn, the Web server program 110 submits the specified SMASH CLP command to the SMASH CLP engine 112 via the interface 114. The results of the execution of the SMASH CLP command are then returned to the Web server program 110. Thereafter, the results of the execution of the SMASH CLP command are returned to the Web browser 106 for display within the window 312. In the example shown in FIG. 3, a user has utilized the user interface control 302 to cause the SMASH CLP command "show" to be executed at the SMASH CLP engine 112. The results of the execution of this command are illustrated within the window 312. Additional examples of the operation and use of the graphical user interface provided herein will be disclosed below with reference to FIGS. 4 and 5.

Figure 4:
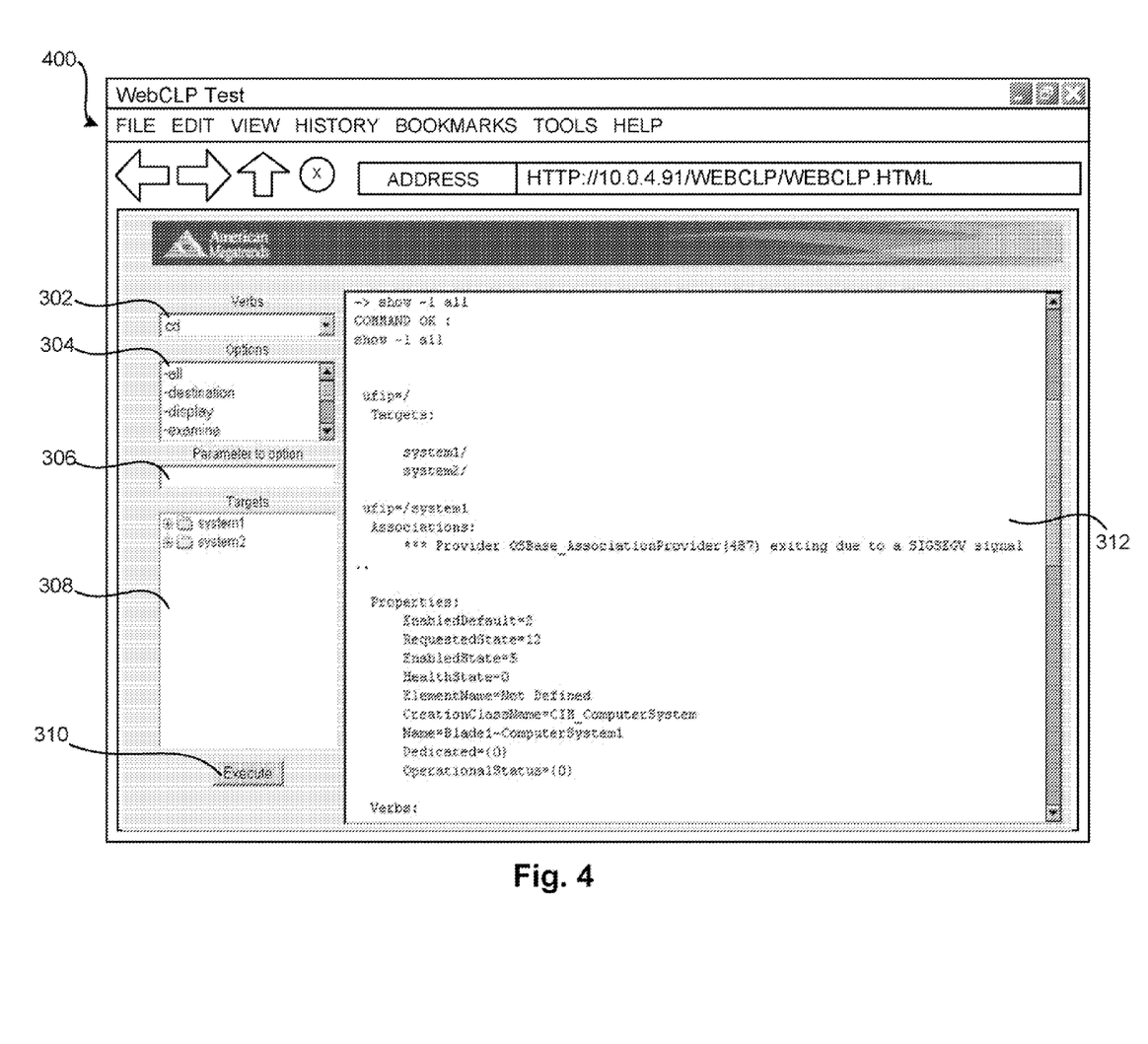

FIG. 4 is a screen diagram showing additional aspects of a Web-based user interface provided herein for submitting SMASH CLP commands to the BMC 108. In particular, FIG. 4 shows additional aspects of the GUI provided by the Web pages 204 for creating and executing a SMASH CLP command. In particular, FIG. 4 shows a screen display 400 that includes the results of the execution of a more complex SMASH CLP command than the one illustrated with respect to FIG. 3.

In the example shown in FIG. 4, a user has created a SMASH CLP command "show -1 all" utilizing the user interface controls 302-306. The user has then selected the user interface control 310 to cause the created SMASH CLP command to be executed at the BMC 108. The results of the execution of the specified SMASH CLP commands are shown in the window 312. It should be appreciated that virtually any SMASH CLP command may be graphically specified utilizing the user interface controls 302-308.

Figure 5:
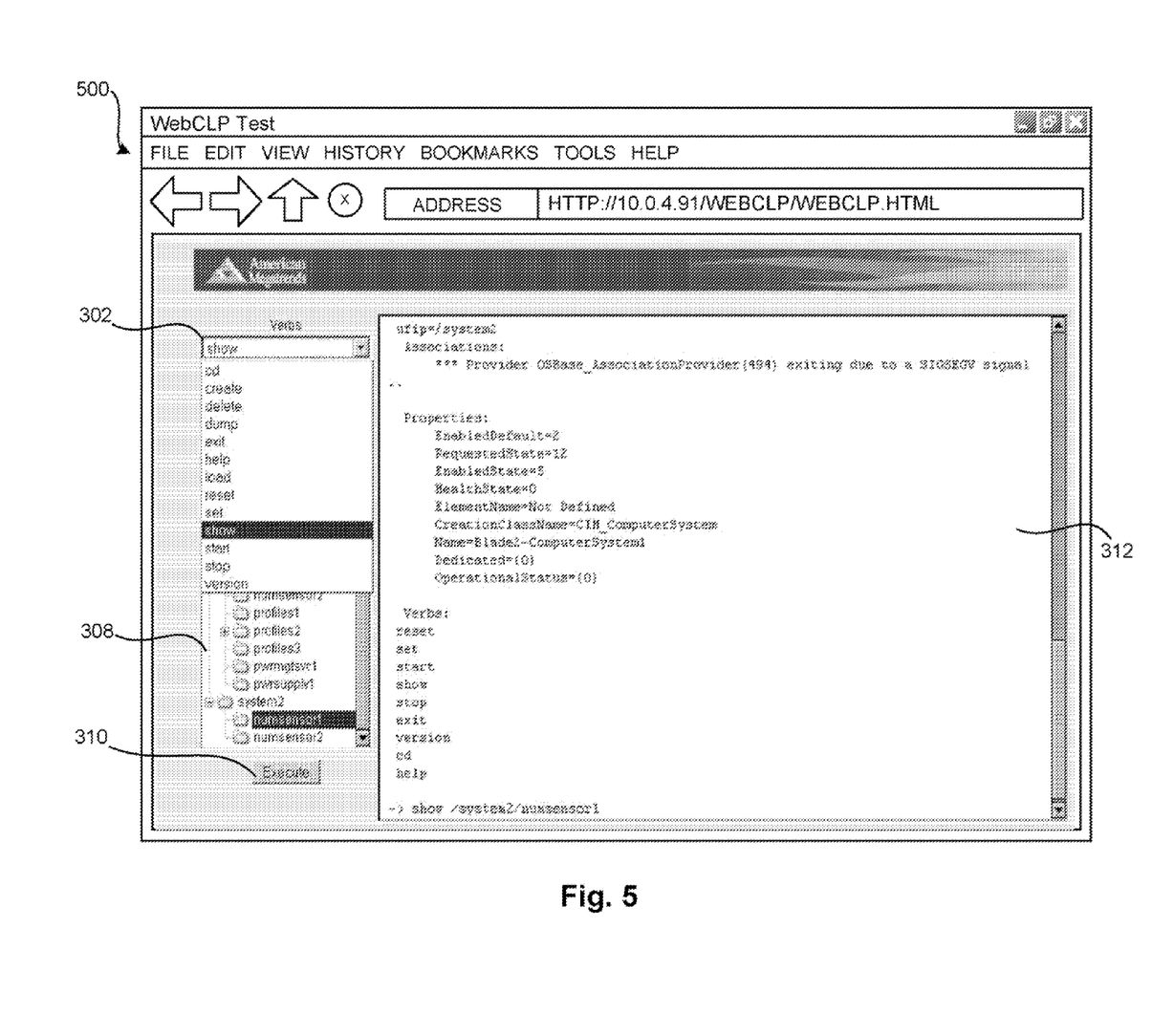

FIG. 5 is a screen diagram showing other aspects of a Web-based user interface provided herein for submitting SMASH CLP commands to the BMC 108. In particular, FIG. 5 shows additional aspects of the GUI provided by the Web pages 204. The screen display 500 illustrated in FIG. 5 shows the user interface control 302 in its completely displayed state. In this state, each of the available SMASH CLP verbs are displayed to a user and made available for selection. In the example shown in FIG. 5, a user has selected the SMASH CLP command "show". Additionally, in the example shown in FIG. 5, additional aspects of the graphical tree 308 are illustrated. In particular, in this example, the tree is shown in its exploded form. Moreover, in this example, a user has selected one of the targets displayed within the graphical tree 308 for inclusion in the specified SMASH CLP command. In particular, the window 312 illustrates a SMASH CLP command that includes the show verb specified with the user interface control 302 and the "/system2/numsensor1" target that has been specified utilizing the graphical tree 308. In this manner, the graphical tree 308 can be navigated to include the identities of the managed targets within the host computer 104 in a SMASH CLP command. Once the command has been created in this manner, the user interface control 310 can be selected to cause the specified SMASH CLP command to be executed at the SMASH CLP engine 112.

Figure 6:
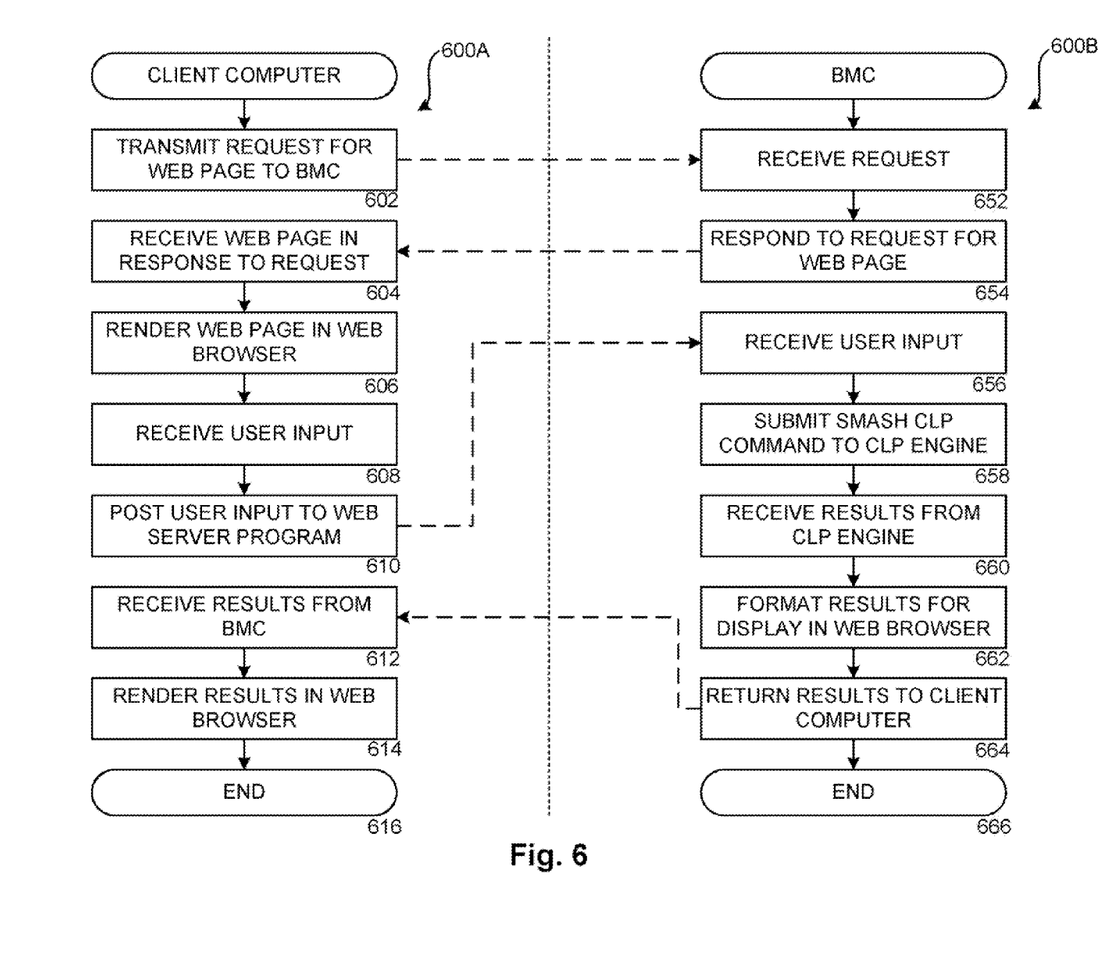
FIG. 6 is a flow diagram showing operations performed by a client computer and a BMC in one embodiment presented herein.

FIG. 6 is a flow diagram showing operations performed by a client computer and a BMC in one embodiment presented herein. In particular, FIG. 6 is a flow diagram illustrating several routines 600A and 600B that show the operation of the client computer 102 and the BMC 108, respectively, in one embodiment provided herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600A beings at operation 600, where the Web browser 106 executing at the client computer 102 transmits a request for a Web page 204 to the BMC 108. The BMC 108 receives this request at operation 652 of the routine 600B. In particular, the Web server program 110 receives the request from the Web browser 106 for one of the Web pages 204. In response to the request, the Web server program 110 generates the requested Web page 204. This may include, for instance, communicating with the SMASH CLP engine 112 to populate the graphical tree 308 with the hierarchical list of managed targets within the host computer 104. This may also include, for instance, populating the various fields for creating the user interface controls 302-306 with the available SMASH CLP commands. When the requested Web page 204 has been constructed, the Web server program 110 returns the requested Web page 204 to the Web browser 106 at operation 654. The Web browser 106 receives the requested Web page 204 at operation 604 of the routine 600A. The Web browser 106 then renders the Web page for use by a user of the client computer 102. In particular, the Web page 204 is rendered in one embodiment to present the screen displays illustrated with respect to FIGS. 3-5.

Once the graphical user interface provided by the Web pages 204 has been rendered by the Web browser 106, user input may be received at operation 608. As discussed above with respect to FIGS. 3-5, the user interface controls 302-308 may be utilized to specify a SMASH CLP command for execution by the SMASH CLP engine 112. Once the user has completed creation of the SMASH CLP command, the user interface control 310 is selected to cause the specified SMASH CLP command to be posted to the Web server program 110. The specified SMASH CLP command is transmitted to the Web server program 110 at operation 610 of the routine 600A.

The Web server program 110 receives the specified SMASH CLP command at the operation 656 of the routine 600B. In response thereto, the Web server program 110 submits the specified SMASH CLP command to the SMASH CLP engine 112 at operation 658. The SMASH CLP engine 112 executes the specified command with respect to the managed targets within the host computer 104 and returns the results to the Web server program 110. The SMASH CLP engine 112 returns the results via the software interface 114.

At operation 660, the Web server program 110 receives the results of the execution of the specified SMASH CLP command from the SMASH CLP engine 112. The Web server program 110 then formats the returned results for display within the Web browser 106. In particular, the SMASH CLP engine 112 may return results in an extensible markup language ("XML") format or other type of format that may be converted for display within the window 312. Once the Web server program 110 has formatted the results appropriately, the results of the execution of the SMASH CLP command are returned to the Web browser 106 at operation 664.

The Web browser 106 receives the results from the BMC 108 at operation 612 of the routine 600A. The returned results are then displayed within the window 312 of the graphical user interface. At operation 614, the routine 600A continues to operation 616, where it ends. The routine 600B continues from operation 664 to operation 666, where it ends. It should be appreciated that these routines may be repeated indefinitely to execute multiple SMASH CLP commands at the BMC 108.

Figure 7:
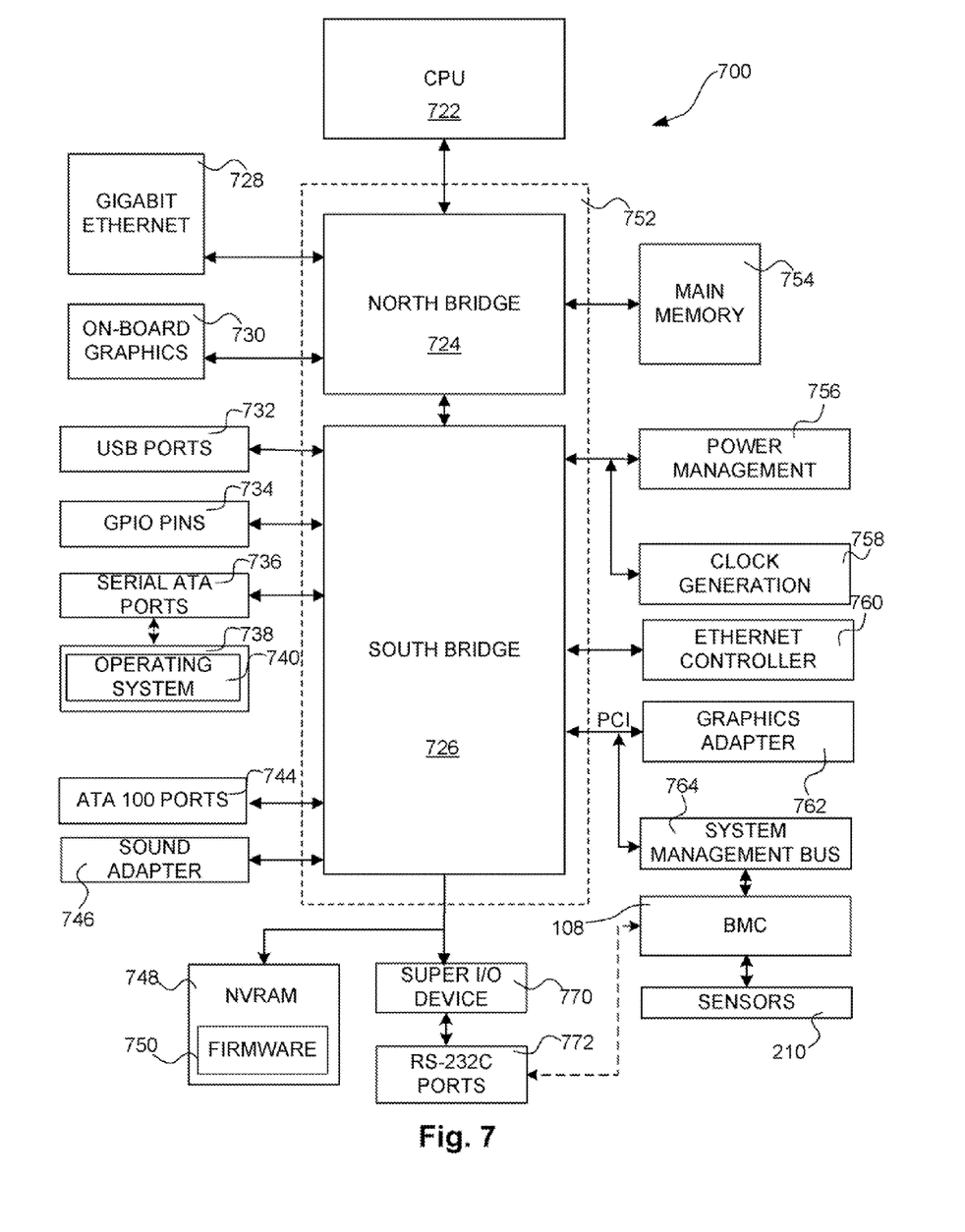
FIG. 7 is a computer architecture diagram showing an illustrative hardware architecture that may be utilized to embody the various computer systems described herein.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 7 shows a computer architecture for an illustrative computer 700 that may be utilized to embody the hardware and software components presented herein for the host computer 104. Some or all of the architecture shown in FIG. 7 may also be utilized to implement the client computer 102. As discussed above, other types of computers and computing devices may also be utilized to implement the embodiments presented herein.

The computer 700 includes a baseboard, or "motherboard", which is a printed circuit board to which a multitude of components or devices may be connected by way of a system bus or other electrical communication path. In one illustrative embodiment, a CPU 722 operates in conjunction with a chipset 752. The CPU 722 is a standard central processor that performs arithmetic and logical operations necessary for the operation of the computer. The computer 700 may include a multitude of CPUs 722.

The chipset 752 includes a north bridge 724 and a south bridge 726. The north bridge 724 provides an interface between the CPU 722 and the remainder of the computer 700. The north bridge 724 also provides an interface to a random access memory ("RAM") 754 used as the main memory in the computer 700 and, possibly, to an on-board graphics adapter 730. The north bridge 724 may also include functionality for providing networking functionality through a gigabit Ethernet adapter 728. The gigabit Ethernet adapter 728 is capable of connecting the computer 700 to another computer via a network. Connections that may be made by the network adapter 728 may include LAN or WAN connections. LAN and WAN networking environments are commonplace in offices, enterprise-wide computer networks, intranets, and the Internet. The north bridge 724 is connected to the south bridge 726.

The south bridge 726 is responsible for controlling many of the input/output functions of the computer 700. In particular, the south bridge 726 may provide one or more universal serial bus ("USB") ports 732, a sound adapter 746, an Ethernet controller 760, and one or more general-purpose input/output ("GPIO") pins 734. The south bridge 726 may also provide a bus for interfacing peripheral card devices such as a graphics adapter 762. In one embodiment, the bus comprises a peripheral component interconnect ("PCI") bus. The south bridge 726 may also provide a system management bus 764 for use in managing the various components of the computer 700. Additional details regarding the operation of the system management bus 764 and its connected components are provided below.

The south bridge 726 is also operative to provide one or more interfaces for connecting mass storage devices to the computer 700. For instance, according to an embodiment, the south bridge 726 includes a serial advanced technology attachment ("SATA") adapter for providing one or more SATA ports 736 and an ATA 100 adapter for providing one or more ATA 100 ports 744. The SATA ports 736 and the ATA 100 ports 744 may be, in turn, connected to one or more mass storage devices such as the SATA disk drive 738 storing an operating system 740 and application programs. As known to those skilled in the art, an operating system 740 comprises a set of programs that control operations of a computer and allocation of resources. An application program is software that runs on top of the operating system software, or other runtime environment, and uses computer resources to perform application specific tasks desired by the user. According to one embodiment of the invention, the operating system 740 comprises the LINUX operating system. According to another embodiment of the invention the operating system 740 comprises the WINDOWS SERVER operating system from MICROSOFT CORPORATION. According to another embodiment, the operating system 740 comprises the UNIX or SOLARIS operating system. It should be appreciated that other operating systems may also be utilized.

The mass storage devices connected to the south bridge 726, and their associated computer-readable media, provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information.

A low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer storage media such as a ROM or a flash memory such as a NVRAM 748 for storing the firmware 750 that includes program code containing the basic routines that help to start up the computer 700 and to transfer information between elements within the computer 700.

As described briefly above, the south bridge 726 may include a system management bus 764. The system management bus 764 may be connected to the BMC 108. As discussed above, the BMC 108 is a microcontroller that monitors operation of the computer system 700. In a more specific embodiment, the BMC 108 monitors health-related aspects associated with the computer system 700, such as, but not limited to, the temperature of one or more components of the computer system 700, speed of rotational components (e.g., spindle motor, CPU Fan, etc.) within the system, the voltage across or applied to one or more components within the system 700, and the available or used capacity of memory devices within the system 700. To accomplish these monitoring functions, the BMC 108 is communicatively connected to one or more components by way of the management bus 764. In an embodiment, these components include sensor devices 210 for measuring various operating and performance-related parameters within the computer system 700. The sensor devices 210 may be either hardware or software based components configured or programmed to measure or detect one or more of the various operating and performance-related parameters. The BMC 108 also includes the additional functionality described above for providing a Web-based interface for executing SMASH CLP commands.

It should be appreciated that the computer 700 may comprise other types of computing devices, including hand-held computers, embedded computer systems, personal digital assistants, and other types of computing devices known to those skilled in the art. It is also contemplated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for providing a Web-based user interface for executing SMASH CLP commands are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for executing a Systems Management Architecture for Server Hardware Command Line Protocol (SMASH CLP) command from a World Wide Web (Web) browser application program, the method comprising:
providing a Web server program and a SMASH CLP engine within firmware of a baseboard management controller (BMC) coupled with a system management bus of a host computer;
receiving a request to execute a SMASH CLP command from a Web browser application program at the Web server program, wherein the SMASH CLP command is posted to the Web server program;
in response to the request, executing the SMASH CLP engine within the firmware to run the SMASH CLP command at the BMC such that the SMASH CLP engine causes the BMC to retrieve, through the system management bus, information regarding the host computer; and
returning the retrieved information regarding the host computer in an XML format to the Web browser application program;
wherein the firmware comprises a stored web page that is configured to display a graphical user interface for visually constructing the SMASH CLP command when rendered by the Web browser application program.

2. The method of claim 1, wherein the firmware of the BMC comprises an interface between the Web server program and the SMASH CLP engine.

3. The method of claim 2, wherein executing the SMASH CLP command at the BMC comprises providing the SMASH CLP command to the SMASH CLP engine via the interface and executing the SMASH CLP command at the SMASH CLP engine.

4. The method of claim 3 wherein the Web page is further configured to display a graphical tree for showing one or more entities managed by the BMC within a host computer system when rendered by the Web browser application program.

5. The method of claim 4, wherein the Web page is further configured to display the results of the execution of the SMASH CLP command when rendered by the Web browser application program.

6. The method of claim 5, wherein the Web page is further configured to display a user interface control when rendered by the Web browser application program, and wherein a selection of the user interface control is operative to cause the Web browser application program to transmit the request to execute a SMASH CLP command to the Web server program.

7. An apparatus configured to permit the execution of a Systems Management Architecture for Server Hardware Command Line Protocol (SMASH CLP) command from a World Wide Web (Web) browser application program, the apparatus comprising:
a baseboard management controller (BMC) coupled with a system management bus of a host computer, wherein the BMC includes
a processor; and
firmware configured to include
a management application having computer-executable instructions which, when executed by the processor, provide baseboard management functions;
a Web server program having computer-executable instructions which, when executed by the processor, receive a request from a Web browser application program to execute a SMASH CLP command;
a SMASH CLP engine having computer-executable instructions which, when executed by the processor, execute the SMASH CLP command such that the SMASH CLP engine causes the BMC to retrieve, through the system management bus, information regarding the host computer;
an interface between the Web server program and the SMASH CLP engine for providing the SMASH CLP command from the Web server program to the SMASH CLP engine; and
a Web page configured to display a user interface control when rendered by the Web browser application program, wherein a selection of the user interface control is operative to cause the Web browser application program to transmit the request to execute the SMASH CLP command to the Web server program,
wherein the processor is configured to execute the firmware including the Web server program and the SMASH CLP engine for executing the SMASH CLP command.

8. The apparatus of claim 7, wherein the Web server program is further operative to, when executed by the processor, transmit the request to the SMASH CLP engine via the interface, to receive results from the execution of the SMASH CLP command from the SMASH CLP engine via the interface, and to return the results to the Web browser application program in response to the request to execute the SMASH CLP command.

9. The apparatus of claim 8, wherein the Web server program is further operative to, when executed by the processor, transmit the Web page to the Web browser application program.

10. The apparatus of claim 9, wherein the Web page is further configured to display a graphical user interface for visually constructing the SMASH CLP command when rendered by the Web browser application program.

11. The apparatus of claim 10, wherein the Web page is further configured to display a graphical tree for showing one or more managed entities within a host computer system when rendered by the Web browser application program.

12. The apparatus of claim 11, wherein the Web page is further configured to display the results of the execution of the SMASH CLP command when rendered within the Web browser application program.

13. A non-transitory computer readable medium having computer-executable instructions stored thereon which, when executed by a processor cause a computing device to:
execute a World Wide Web (Web) server program provided within firmware of a baseboard management controller (BMC) coupled with a system management bus of a host computer;
execute a Systems Management Architecture for Server Hardware Command Line Protocol (SMASH CLP) engine provided within the firmware and that is operative to execute SMASH CLP commands;
establish an interface between the Web server program and the SMASH CLP engine;
receive a request from a Web browser application program at the Web server program, wherein the request is configured for executing a specified SMASH CLP command;
in response to receiving the request, provide the specified SMASH CLP command to the SMASH CLP engine via the interface;
execute the SMASH CLP engine within the firmware to run the specified SMASH CLP command such that the SMASH CLP engine causes the BMC to retrieve, through the system management bus, information regarding the host computer;

receive information regarding the host computer from the SMASH CLP engine via the interface, and transmit the information to the Web browser application program; and cause the Web server program to transmit a Web page that is stored at the firmware to the Web browser application program, the Web page configured to display a user interface control when rendered by the Web browser application program, and wherein a selection of the user interface control is operative to cause the Web browser application program to transmit the request to execute the specified SMASH CLP command to the Web server program.

14. The non-transitory computer-readable medium of claim 13, wherein the Web page is further configured to display a graphical user interface for visually constructing the SMASH CLP command when rendered by the Web browser application program.

15. The non-transitory computer-readable medium of claim 14, wherein the Web page is further configured to display a graphical tree for showing one or more managed entities within a host computer system when rendered by the Web browser application program.

16. The non-transitory computer-readable medium of claim 15, wherein the Web page is further configured to display the results of the execution of the SMASH CLP command when rendered by the Web browser application program.

* * * * *